United States Patent [19]

Gross et al.

[11] 4,066,063
[45] Jan. 3, 1978

[54] DEVICE FOR THE TRANSMISSION OF SOLAR ENERGY TO A LIQUID MEDIUM

[75] Inventors: Erwin Gross, Burgsolms; Hans Vowinkel, Florsheim (Main), both of Germany

[73] Assignee: Hoechst Aktiengesellschaft, Frankfurt am Main, Germany

[21] Appl. No.: 698,841

[22] Filed: June 23, 1976

[30] Foreign Application Priority Data

June 25, 1975 Germany ............................ 2528267

[51] Int. Cl.$^2$ ................................................ F24J 3/02
[52] U.S. Cl. ..................................... 126/271; 165/171
[58] Field of Search ................... 165/171; 126/271, 270

[56] References Cited

U.S. PATENT DOCUMENTS

| 2,274,492 | 2/1942 | Modine | 126/271 |
| 3,239,000 | 3/1966 | Meagher | 126/271 |
| 3,648,768 | 3/1972 | Scholl | 165/171 |
| 3,918,430 | 11/1975 | Stout et al. | 126/271 |

FOREIGN PATENT DOCUMENTS

| 869,747 | 6/1961 | United Kingdom | 126/271 |

Primary Examiner—Kenneth W. Sprague
Attorney, Agent, or Firm—Curtis, Morris & Safford

[57] ABSTRACT

A device for the transmission of solar energy to a liquid medium is composed of a platelike, flat hollow piece made from a plastics material and being provided with tubular flow channels, which is mounted in a flat-bottomed box under a translucent covering while being insulated.

6 Claims, 3 Drawing Figures

DEVICE FOR THE TRANSMISSION OF SOLAR ENERGY TO A LIQUID MEDIUM

Various systems for directly exploiting solar energie are already known. Hitherto none of these systems has enabled replacing substantially further sources of energy by solar energy. In the future this situation will certainly scarcely change. It seems however significant and necessary for surmounting bottlenecks in the supply of energy in the future to utilize solar energy as additional heat for certain purposes.

One of the proposed methods of exploiting solar energy consists in heating a liquid medium in a metallic heat exchanger by insolation and in passing the heated medium such as oil, water or water-glycol mixtures to a heat absorber or heat accumulator. Such metallic heat exchangers most frequently are composed of a metal plate, for example of aluminum and a helical conduit, preferably of copper, mounted thereon. An important part of the thermal energy absorbed by the plate is emitted to the liquid circulating in the conduit owing to the good heat conduction of the metal. For improving the heat absorption the surface of the heat exchanger is usually black colored. In order to keep losses of heat as low as possible the heat exchangers are insulated, for example by rigid foam, glass wool or stone wool, lodged in boxes of adequate size and covered with a translucent plate of glass or a plastics material or with a sheet.

The liquid medium heated by the solar energy may attain temperatures of more than 60° C. It may be used, for example for the heating of rooms, swimming pools or floors in roof gardens, for warm water heating, in nurseries and greenhouses.

The use of intercalated heat accumulators enables a certain compensation between the period of the greatest heat development and that of the greatest heat demand.

It has already been proposed to cover roofs with such heat exchangers. The metal constructions are however relatively expensive as the heat exchangers are fabricated with a high labor content. Moreover a good insulation towards the roof is required for keeping the losses of heat as low as possible. The high weight of the metallic heat exchangers constitutes an especial problem. When covering substantial areas of a roof with heat exchangers the construction of the roof will have to be fortified in adequate manner.

It is therefore desirable to fabricate the corresponding heat exchangers with a lighter material, for example a plastics material. The low thermal conductivity of plastics materials however is opposed to copying the metallic heat exchangers in a plastics material. A heated plastics plate would only emit a small portion of the absorbed heat to the conduit lying thereunder. Parts of the plate lacking a direct connection with the serpentine conduit would be overheated, as a consequence of which tensions in the plate would be produced and ageing phenomena would occur. The fabrication of heat exchangers made of a plastics material and being mounted in adequate manner would moreover go with a high labor content and be expensive, consequently.

It has now been found that flat, platelike hollow pieces of a plastics material provided with tubular flow channels are extremely appropriate as heat exchangers, when the cross section of the channels does not pass 25 mm and when the distance of the channels from each other is not more than 30 mm. This construction permits an adequate heat emission to the liquid medium passing through and avoids overheating of the relatively narrow spots between the channels.

The present invention consequently provides a device for the transmission of solar energy to a liquid medium, composed of a heat exchanger mounted in a flat-bottomed box under a translucent covering and being provided with an insulation, which comprises using as heat exchanger a platelike flat hollow piece made of a plastics material, which is provided with tubular flow channels for the liquid heat transmission medium, the channels of which having a diameter of from 5 to 25 mm, preferably of from 10 to 15 mm and a distance from each other of from 2 to 30 mm, preferably of from 3 to 6 mm. The channels may be helical or two collecting canals running on two opposite sides may be connected by vertically running canals. For saving weight the mounting box, the insulating layer and the transparent covering are fabricated advantageously from a plastics material. The heat exchanger according to the invention provided with the mounting box and the covering is considerably lighter than heat exchangers known hitherto and absolutely resistant to corrosion.

It is also resistant to chlorine-containing water of swimming pools. The heat exchanger may be easily transported. For practical reasons dimensions of 0.5 to 1 m × 1.5 to 2 m are preferred. For producing greater quantities of heat several heat exchangers may be connected. They may be placed in the field on adequate portable structures or be mounted on roofs. A complete covering of the roof is possible without especial structural expenditure.

The insulating layer preferably consisting of a plastics foam assures a good insulation towards the base, for example the roof. The foam layer morever leads to a stiffening of the walls of the mounting box so that the latter may have thin walls. All parts of the device may be fabricated by economical thermoplast processing methods, for example blowing, injection molding, extrusion, deep drawing, and foaming.

The mounting box may be fabricated from usual thermoplasts, for example vinyl chloride polymers, polyolefins, or styrene polymers. Impact resistant polyvinyl chloride, for example mixtures of polyvinyl chloride with chlorinated polyethylene or polyvinyl chloride modified by ethylene/vinyl acetate copolymers, polystyrene modified by caoutchouc, polyolefins or polyester cast resins reinforced by glass fibers are used preferably. The box may be injection molded, deep drawn from plates or blown from hollow pieces. In the blowing method there is either manufactured a double-walled box or two boxes are fabricated in one piece and then separated by cutting. For the insulating layer there is used preferably a rigid foam of polystyrene, for example an extruded foamed plate or polyurethane. Glass and stone wool may also be used naturally. When using a double-walled box the cavity may be filled with a reactive foam, for example polyurethane. It is moreover possible to injection mold the box from a thermoplast containing a blowing agent, for example polystyrene or polypropylene in such a manner that a so-called integral foamed piece is obtained having a solid coating and a foamed core. Such a box foamed in the core has a higher stability and an additional insulating layer may be dispensed with.

The actual heat exchanger being passed by the liquid medium must be capable of enduring constant temperatures of up to 80° C and an inner pressure of up to 2 bars. Polypropylene stabilized against the action of heat and UV radiation has proved especially advantageous. The platelike hollow piece is preferably blown from a tubular preform or from two sheets moving forward in parallel direction one upon the other. It may also be obtained by welding two bowl-shaped deep drawn or injection molded halves.

The thickness of the wall should be in the range of from 1 to 3 mm, preferably of from 1 to 2 mm, in order to assure a good energy transmission.

A plastics material pigmented black is advantageously used for manufacturing the heat exchanger. It is also possible to coat the surface black or, when manufacturing the heat exchanger from a translucent material to dye the inner side of the lower wall black. This may be readily achieved for example by flooding the horizontally lying heat exchanger with a black varnish. When manufacturing the heat exchanger from two prefabricated halves or by the blowing of two sheets it is also possible to combine a translucent upper side with a upper side colored dark. If the upper side is transparent, the solar heat is absorbed by the dark inner wall and directly transmitted to the liquid medium.

For manufacturing the translucent covering plate there may be used glass or, in order to save weight, a plastics material, for example polymethylmethacrylate, polycarbonate or an impact resistant polyvinyl chloride. The covering should be waterproof and airtight.

Care must be taken that an adequate circulation of the liquid medium is assured by installing a circulation pump in order to avoid local overheating. Care must also be taken that the interior pressure does not pass 2 bars.

The invention will be illustrated, by way of example, in the accompanying drawings.

Figure 1:
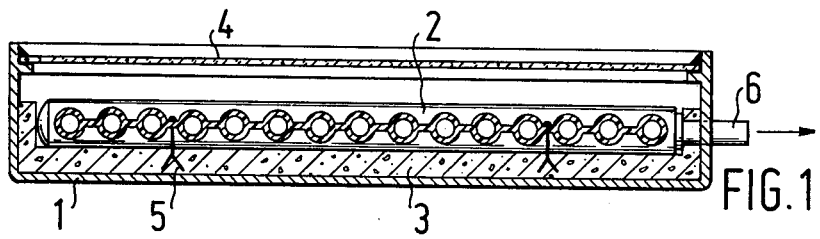
FIG. 1 is a cross section of the device according to the invention.

The essential parts of the device according to the invention shown in the drawing are the mounting box 1, the heat exchanger 2, the insulating foam layer 3 and the translucent covering plate 4. The adhesion between the heat exchanger and the insulating layer may be improved by pallet pins 5.

A connecting piece 6 at the front side of the heat exchanger 2 allows the connection with further heat exchangers or collecting tubes 7, 8 or with conduits leading to the heat consumer or the heat accumulator. The connecting pieces may also be installed at the back side of the heat exchanger.

The invention is moreover illustrated in the following example.

EXAMPLE

Figure 2:
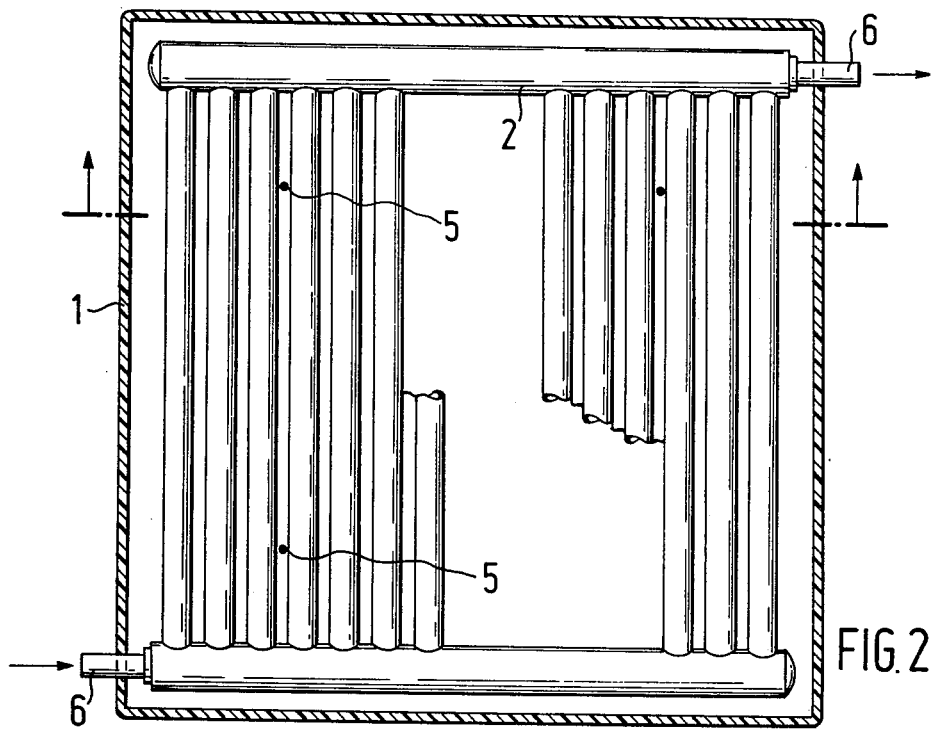
FIG. 2 represents a top view of the device according to FIG. 1.
Figure 3:
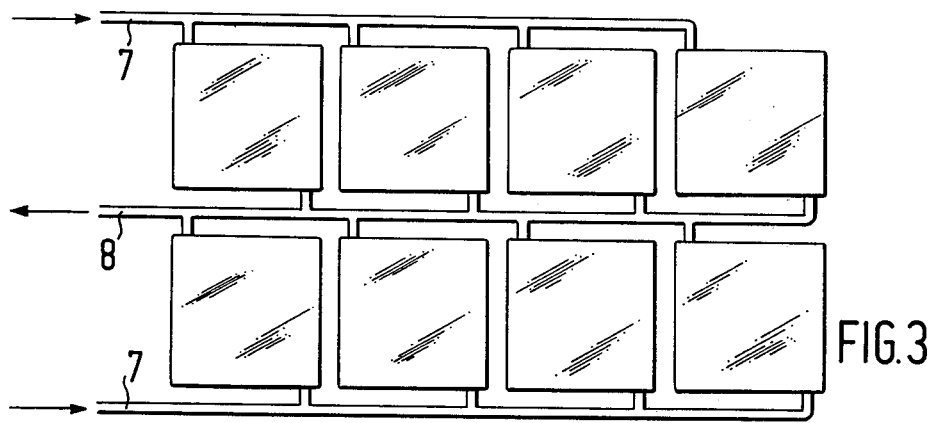
FIG. 3 shows a possibility for connecting several devices according to the invention.

For heating a hotbed the device according to the invention was placed besides the bed with an angle of inclination of 45° towards the South and connected with a flat radiator of polypropylene, embedded in the soil under the bed by means of a tube system. A small pump assured an adequate circulation of the heated medium. The device according to the invention was composed of a mounting box deep-drawn from a plate made from impact resistant polyvinyl chloride, an insulating layer made from foamed polystyrene and having a thickness of 50 mm, the heat exchanger shown in the FIGS. 1 and 2 made from polypropylene and a covering plate of glass. The heat exchanger had a dimension of 1 $\times$ 1 m, and a thickness of the walls of 2 mm. The diameter of the channels was 25 mm and the distance between the flow channels was 2 mm each time. The heat exchanger had been obtained by blowing of an extruded material from a tube, which had been expanded prior to closing the blow mold to form a flat, broad preform. Measurings showed that from 600 to 650 kilocalories/hour had been absorbed by this heat exchanger of 1 m$^2$ size when the sun was shining and that they had been transmitted to the radiator installed in the earth. The plants in the hotbed grew notably more rapidly than those in an unheated bed besides. This heating experiment of the hotbed has been running without any troubles for two years and allows harvesting, for example salad and radishes, 2 to 4 weeks earlier.

What is claimed is:

1. A device for the transmission of solar energy to a liquid medium including a flat-bottomed box having an open top, a light-permeable cover closing said top and a heat exchanger positioned within said box below said cover, said heat exchanger comprising a relatively flat platelike blow molded element having a pair of generally parallely extending spaced collecting channels formed therein and a plurality of liquid flow connecting channels integrally formed and in communication with said collecting channels, said platelike element being blow molded from an extruded tubular preform made of black pigmented polypropylene and said connecting channels having a diameter of from 5 to 25 mm, a wall thickness of from 1 to 3 mm and being spaced from each other a distance of from 2 to 30 mm.

2. A device as claimed in claim 1, wherein said box is made from a thermoplastic material.

3. A device as claimed in claim 2, including an insulating layer made from a foamed plastic, positioned between the heat exchanger and box.

4. A device as claimed in claim 2, wherein said box is injection molded.

5. A device as claimed in claim 2, wherein the mounting box is made from integral foam.

6. A device as claimed in claim 1, wherein said covering is made from polymethylmethacrylate.

* * * * *